(12) United States Patent
Sauer et al.

(10) Patent No.: US 9,711,302 B2
(45) Date of Patent: Jul. 18, 2017

(54) OPERATING MEMBER WITH SWITCHING MAT

(71) Applicant: PREH GmbH, Neustadt a.d. Saale (DE)

(72) Inventors: Marc Sauer, Kunzell (DE); Juergen Stanger, Gotha (DE)

(73) Assignee: PREH GMBH, Bad Neustadt A.D. Saale (DE)

( * ) Notice: Subject to any disclaimer, the term of this patent is extended or adjusted under 35 U.S.C. 154(b) by 0 days.

(21) Appl. No.: 14/868,291

(22) Filed: Sep. 28, 2015

(65) Prior Publication Data

US 2016/0093454 A1    Mar. 31, 2016

(30) Foreign Application Priority Data

Sep. 30, 2014  (DE) .................. 10 2014 114 170

(51) Int. Cl.
*H01H 13/702* (2006.01)
*H01H 13/14* (2006.01)
*H01H 13/88* (2006.01)
*G06F 3/044* (2006.01)

(52) U.S. Cl.
CPC ............. *H01H 13/14* (2013.01); *G06F 3/044* (2013.01); *H01H 13/702* (2013.01); *H01H 13/88* (2013.01); *H01H 2215/00* (2013.01)

(58) Field of Classification Search
CPC ..... H01H 2239/006; H01H 2003/0293; H01H 2225/03; H01H 2209/004; H01H 2209/074; H01H 2215/016; H01H 13/10; H01H 13/702; H01H 2207/03; H01H 2215/004

USPC .......................... 200/600, 292, 512–517, 217
See application file for complete search history.

(56) References Cited

U.S. PATENT DOCUMENTS

2004/0031673 A1* 2/2004 Levy .................... H01H 13/702
                                                              200/521
2014/0098042 A1* 4/2014 Kuo ........................ G06F 3/041
                                                              345/173

FOREIGN PATENT DOCUMENTS

DE    102005054677 A1    6/2007
DE    102008012921 A1    9/2009
DE    102010034721 A1    3/2011

* cited by examiner

*Primary Examiner* — Edwin A. Leon
*Assistant Examiner* — Ahmed Saeed
(74) *Attorney, Agent, or Firm* — Cantor Colburn LLP

(57) ABSTRACT

An operating member including an actuating part movably mounted between a rest position and a switching position, a circuit board with an open contacting portion, a switching mat made of an elastic material disposed adjacent to the circuit board, and at least one contact pill formed on a side of the switching mat facing towards the circuit board, which cooperate in such a way that, in the switching position of the actuating part at the latest, the open contacting portion of the circuit board is closed by the contact pill, and where the switching mat moreover forms at least one tactile-feel dome which is associated with the contact pill, is elastically compressible by actuation of the actuating part in the direction of the switching position and which, in its initial position, defines a unilaterally open hollow volume in the switching mat, in order to cause a tactile feedback on the actuating part, where the contact pill is disposed outside the hollow volume defined by the tactile-feel dome.

13 Claims, 1 Drawing Sheet

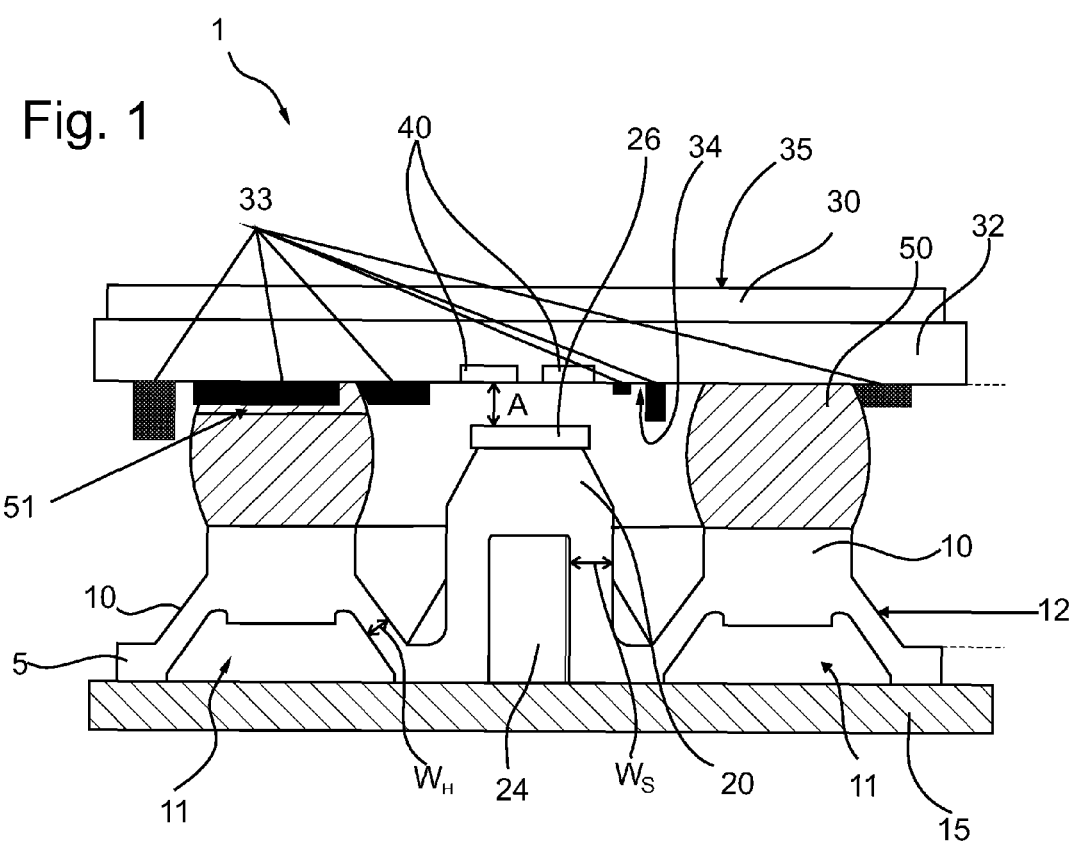
Fig. 1
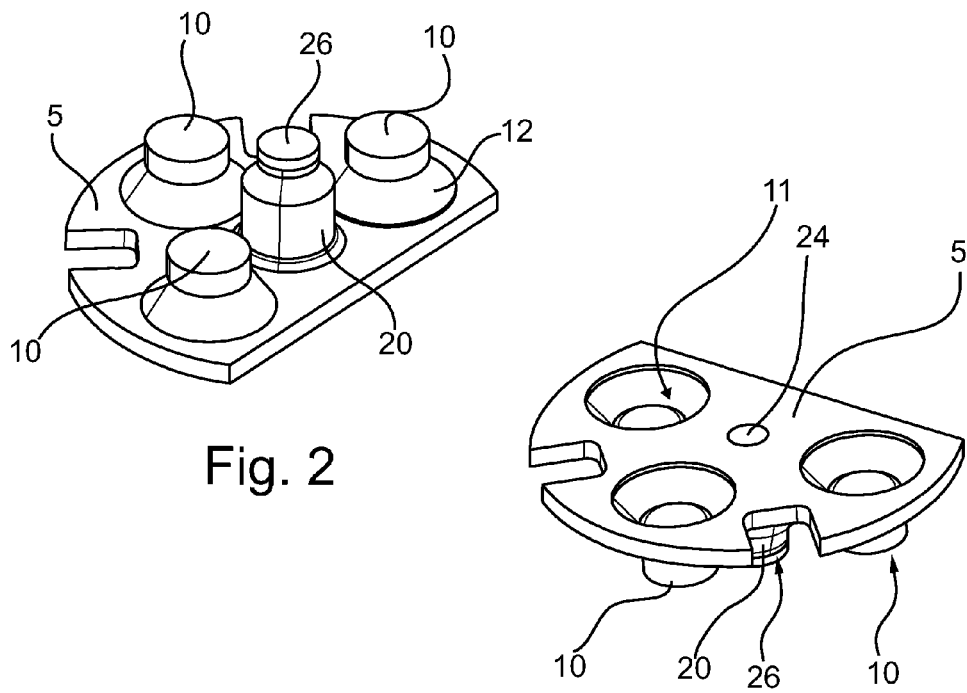
Fig. 2
Fig. 3

OPERATING MEMBER WITH SWITCHING MAT

CROSS REFERENCE TO RELATED APPLICATION

This application is related to and claims the benefit of German Patent Application Number 10 2014 114 170.9 filed on 30 Sep. 2014, the contents of which are herein incorporated by reference in their entirety.

TECHNICAL FIELD

The present invention relates to an operating member with an electrical switching functionality realized by means of a switching mat, in particular for the automobile sector.

BACKGROUND

Such a switching mat, also referred to as switching mat or keyboard mat, is the central component in many operating members, particularly those with a key switching functionality. It determines the feel, i.e. the tactile impression, but also the electrical behavior via the integrated contact pill. Such switching mats, which are disposed above a circuit board, also referred to as printed circuit board, are usually made from silicone rubber and, due to the combination of tactile feel or return action and electrical switching function, provide for a high integration density, but also, due to the two-dimensional configuration, for protection in order to prevent dust, dirt and liquid from entering the contacting portion of the operation member. A frustoconical or bell-shaped dome, which transitions into a cylinder in, for example, the central axis, is usually formed from the basic material silicone rubber. A unilaterally open cavity placed on the circuit board is defined underneath the dome. The outer end of the cylinder constitutes the point of application for an actuating part. The inner end of the cylinder situated in the cavity has a contact pill made of electrically conductive material and constitutes the electrical contact member. The contact pill usually cooperates with an open contacting portion, which is disposed underneath the dome on the circuit board and which is bridged by the contact pill. Mostly, several key switches are realized at once in a single switching mat; however, there are also individual operating members based on a switching mat.

The tactile feel of the operating member can be adapted over a wide range via the shape of the dome or the webs and the material properties of the basic material. A tactile feedback during the actuation of an operating member increases operational reliability because it permits a user to immediately recognize whether a function has been triggered. In contrast to an acoustic feedback, a tactile feedback is advantageous in that it can be easily perceived also in an environment with ambient noise, particularly in an automobile.

Though it is possible to determine the electrical properties of the operating member through the selection of the contact pill, however, due to the fact that the contact pill is disposed in the cavity defined by the associated tactile-feel dome, its geometrical design, however, is limited as regards its thickness and size by the dimensions of the respective cavity. In addition, the contact pill is subject to mechanical wear which, as a rule, affects the switching function. Due to the limitation of the cavity as regards space, this cannot be counteracted by a corresponding design of the contact pill, for example.

Therefore, there is a demand for a design of the operating member in which this limitation is removed, if possible, and which on the whole results in a more reliable, in particular more temperature-resistant, operating member.

BRIEF SUMMARY

The invention relates to an operating member comprising an actuating part movably mounted between a rest position and a switching position, a circuit board with an open contacting portion and a switching mat made of an elastic material, for example of silicone rubber, disposed adjacent to the circuit board. According to the invention, embodiments are included in which the switching mat is spaced from the circuit board in the rest condition, in which the switching mat is disposed adjacent to the circuit board at least in some sections, or is supported on the circuit board via a separate spacer part. The open contacting portion comprises at least two contact surfaces, which are disposed spaced apart from each other, and thus in an electrical insulating manner, but which are exposed, i.e. contactable. The contact surfaces are provided on the circuit board, for example, in the form of conductor paths configured in a comb or meandering structure. "Open" within the sense of the invention means that the contact surfaces are not bridged in a conductive manner, but can be connected in an electrically conductive manner by touch. Further, the operating member according to the invention has at least one contact pill disposed on a side of the switching mat facing towards the circuit board. The actuating part, the switching mat, in particular its contact pill and the contacting portion are disposed and designed in such a way that the contacting portion is not electrically closed by the contact pill in the rest position, but that, at the latest, the open contacting portion of the circuit board is closed by the contact pill in the switching position of the actuating part, i.e. the at least two open contact surfaces are bridged in an electrically conductive manner.

Furthermore, the switching mat has at least one tactile-feel dome which is associated with the contact pill, is elastically compressible by actuation of the actuating part in the direction of the switching position and which, in its initial position, defines a unilaterally open hollow volume in the switching mat. The switching mat including the tactile-feel dome is preferably made from a rubber, still more preferably from a silicone rubber.

The tactile-feel dome is configured substantially in the shape of a bell or of a hollow truncated cone, for example. The tactile-feel dome is provided for causing a tactile feedback on the actuating part by generating, while counteracting its compression, a restoring force which is perceivable in a tactile manner on the actuating part. "Compressible" within the sense of the invention means at least a reduction of the structural height or volume provided in the original position of the tactile-feel dome defined by the rest position of the actuating part. Preferably, this reduction takes place by collapsing or folding the tactile-feel dome. Furthermore, the term "elastically compressible" is supposed to comprise the automatic return of the tactile-feel dome into its original shape after the compressing action has been removed.

According to the invention, the contact pill is disposed outside the hollow volume defined by the tactile-feel dome. Thus, the dimensioning thereof can be chosen independently of that of the hollow volume. Thus, in accordance with the invention and advantageously, the electrical and mechanical properties of the contact pill can be adapted largely independently of the mechanical properties of the tactile-feel dome and, thus, of the tactile feel.

While the tactile feel is adaptable over a wide range via the shape of the dome, its wall thickness and the material properties of the basic material, the electrical properties of the key can now be determined independently of the tactile feel via the size of the contact pill and its material properties. For example, the contact pill is made from a carbon-containing material or provided by means of a coating, or it may be a so-called supraconductive pill (SC pill), i.e. a silicone-filled nickel lattice. According to the invention, the contact pill may be a gold plate or a gold foil or a metallic snap plate. The design that is independent of the tactile feel of the contact pill, such as the thickness and size of the contact surface, permits the realization of an electrical function of the operating member that is as space-saving, stable in the long term and reliable, even at high temperature fluctuations, as possible. Preferably, the switching mat including the tactile-feel dome and the contact pill is configured integrally; for example, a substance-to-substance connection is provided between the contact pill and the rest of the switching mat.

According to a preferred embodiment, the actuating part has a touch-sensitive input surface. For example, a touchpad or touchscreen, i.e. a combination of a display device and a touch-sensitive input surface, is part of the actuating part. The concept according to the invention of the separation of the switching functionality and the tactile feel demonstrates its advantages in the integration of a comparatively extensive actuating surface into an actuating part. A critical point here is, on the one hand, a tactile feedback that is as uniform as possible over the entire actuating surface; this also means a proportionality between the actuating distance and the tactile feedback that is uniform over the actuating surface. Whereas the critical point with respect to the electrical switching functionality is reliable switching and, for example, "merely" a sufficient contact pressure in the respective maximum position. It was found that these two requirements can best be met if the tactile feel and the electrical switching function are separate.

Preferably, the circuit board is disposed on the side of the actuating part facing away from the touch-sensitive input surface. For example, the circuit board comprises electronics for the spatially resolving evaluation of the respective touch by the operator.

In the case of an actuation of the actuating part in the direction of the switching position, the circuit board with the open contacting portion is preferably moved towards the contact pill. For example, the circuit board is movably mounted or supported in an elastically resilient manner.

According to a preferred embodiment of the operating member, the open contacting portion is disposed on a component-carrying side of the circuit board. The component-carrying side means a side of the board that is equipped with parts. Due to the separation of the tactile-feel dome and the switching dome according to the invention, open contacting portions can be integrated into the component-carrying side of a board. In known solutions, an otherwise unequipped circuit board or at least the component-free area of a circuit board is usually used for the arrangement of an open contacting portion and for supporting the switching mat. This is no longer necessary due to the principle according to the invention. The solution according to the invention provides the possibility of disposing the open contacting portion on the equipped side of the circuit board and to surround it with electronic components at a small clear distance of less than 5 millimeters, preferably less than 2 millimeters, still more preferably less than 1 millimeter, in order thus to advantageously save construction space.

According to the invention, the feature of the arrangement of the contact pill outside the hollow volume is also supposed to include an arrangement in which the contact pill is disposed on the dome, i.e. on the side of the dome facing away from the hollow volume. Preferably, however, it is provided that the contact pill is disposed next to the tactile-feel dome. This means an arrangement laterally offset from the axial extent of the tactile-feel dome, whose axial extent is selected to be parallel to the actuation direction.

Preferably, the contact pill is disposed on a raised and/or thickened portion of the switching mat. For example, the switching mat, in the region of the contact pill, has a combination of an increased wall thickness $W_S$ and a raised portion. The latter is also referred to as switching dome in the following. For example, the tactile-feel dome has a wall thickness $W_H$ and the switching dome a wall thickness $W_S$, and both are formed from the material of the switching mat in an integral form. In order to ensure a higher rigidity of the switching dome as compared to the tactile-feel dome, the wall thickness $W_S$ of the switching dome is greater than the wall thickness $W_H$ of the tactile-feel dome, $W_S > W_H$. Preferably, the wall thickness $W_S$ is at least 1.5 times as big the wall thickness $W_H$; $W_S \geq 1.5 \cdot W_H$, particularly preferably, the wall thickness $W_S$ is at least twice as big as the wall thickness $W_H$; $W_S \geq 2 \cdot W_H$.

According to another preferred embodiment, the switching mat, in the region of the contact pill, forms a blind hole that serves for the positive accommodation of an appendage formed by a support part, which is rigid in comparison with the switching mat, so that, on the one hand, a fixing of the position of the switching mat is achieved, and on the other hand, the contact pill is supported close to the contact pill by the supporting part in the state of resting against the contacting portion.

According to a preferred embodiment, several tactile-feel domes are disposed around an associated contact pill, whereby the tactile behavior can be adapted. Still more preferably, the several tactile-feel domes are evenly spaced around the contact pill. According to a preferred embodiment, the several tactile-feel domes are disposed around the contact pill on an imaginary triangle.

According to a preferred embodiment, a spacer member is disposed adjacent to the tactile-feel dome and between the switching mat and the actuating part, optionally between the switching mat and the circuit board. For example, the spacer member has an annular configuration. The spacer member serves for the transmission of the restoring force, which is caused by the tactile-feel dome and on which the tactile feedback is based.

Preferably, the contact pill is disposed on the side of the switching mat facing away from the unilaterally open hollow volume defined by the tactile-feel dome. As a rule, the tactile-feel dome has a shape that tapers to a point in an opposite direction to the actuation direction; for example, it has a frustoconical configuration. This means that the tactile-feel dome, as a rule, requires more construction volume and more support surface at the end thereof forming the hollow volume, compared with its opposite, "pointed" end. Because more construction space is thus available for the contact pill due to the smaller spatial extension at the pointed end, its contact surface can be dimensioned more generously, which increases the reliability of the switching function.

BRIEF DESCRIPTION OF THE DRAWINGS

Other features and advantages of the invention become apparent from the following description of an exemplary embodiment, which shall be understood not to be limiting and which will be explained below with reference to the Figures. In this drawing, the Figures schematically show:

FIG. 1: a portion of a cross section through an operating member according to the invention in its rest position, FIG. 2: a perspective top view onto the associated switching mat with three tactile-feel domes and a switching dome, FIG. 3: a perspective rear view of the switching mat shown in FIG. 2.

DETAILED DESCRIPTION

FIG. 1 shows a cross section of an operating member 1 according to the invention. It comprises a switching mat 5 made of elastic silicone rubber and an operating member 30 disposed above it in its rest position. The actuating part 30 defines a touch-sensitive input surface 35. For example, the actuating part 30 comprises a touchpad or touchscreen, which carry out a spatially resolving detection of the touch by means of a resistive or capacitive measurement. The actuating part thus defines a touch-sensitive input surface 35. A circuit board 32 is disposed as a flat structure underneath the flat actuating part 30 and adjacent and rigidly connected thereto. The circuit board 32 is equipped on one side, so that the side equipped with electronic components 33 is disposed facing away from the actuating part. For example, the components 33 are provided for carrying out the evaluation in respect of the spatially resolving detection of the touchpad of the touchscreen. The actuating part 30 and the circuit board 32 can be moved from the rest position shown, under the influence of an actuating force acting on the actuating part 30, into a switching position, which is not shown, in the direction of a stationary support part 15 disposed underneath the switching mat 5. A contacting portion, which is open in the rest position, with two contacts 40 that are electrically insulated from each other in the rest position is applied between the electronic components 33 on a side 34 of the circuit board 32 facing away from the actuating part 30. An annular spacer member 50 is disposed between the switching mat 5 and the circuit board 32, extending underneath the circuit board 32 and immediately adjacent thereto and around the contacting portion 40. It comprises recesses 51 in order thus to be able to traverse certain components 33 in a bridge-like manner. For example, at least three spaced-apart, point-shaped support regions, or at least three support regions that each form a closed support surface, can be provided via which the spacer element 50 rests on the circuit board 32. This spacer member 50 rests, with the end thereof facing away from the circuit board 32, on the top side of the three tactile-feel domes 10 that are formed around the contacting portions 40 in the switching mat 5. These tactile-feel domes 10 cause the return of the circuit board 32 and the actuating part 30 into the rest position and, by cooperating, generate a tactile feedback counteracting the actuating force due to their snap-like folding behavior and their inherent returning capacity. The tactile-feel domes 10 have a substantially frustoconical configuration, while having a cylindrical configuration at their upper "pointed" ends facing towards the circuit board 32. Underneath them, the tactile-feel domes each form a hollow volume 11, which is open in a downward direction and which is closed by being supported on the support part 15. Between the tactile-feel domes 10, the switching mat 5 forms a raised portion 20, a so-called switching dome. On the end facing towards the circuit board 32, this switching dome 20 carries a contact pill 26 made of an electrically conductive material. The contact pill 26 is arranged in such a way that, in the rest position, it is disposed at a distance A from the contacts 40, whereas, in the switching position, the circuit board 32 and thus the contacts 40 come to rest on the contact pill 26 and the two contact surfaces 40 are bridged in an electrically conductive manner by the contact pill 26. The switching dome 20 is configured in a comparatively rigid manner. Given the same material properties of the switching dome 20 and the tactile-feel dome 10, the high level of rigidity is achieved, among other things, by a wall thickness $W_S$ of the switching dome 20 that is increased compared to the wall thickness $W_H$ of the tactile-feel dome. In their original shape, the tactile-feel domes 10 have a frustoconical basic body with a wall thickness $W_H$. The wall thickness $W_S$ of the switching dome 20 is greater than the wall thickness $W_H$ of the tactile-feel domes 10, whereby a higher rigidity of the switching dome 20 with respect to an external force action is ensured. The switching dome 20 is additionally stiffened by an appendage 24 of the rigid support part 15 reaching in a positive manner from below into the blind hole, which is formed in the switching mat 5, or more specifically, in the switching dome 20. The comparatively rigid configuration of the switching dome 20 ensures that the movement of the circuit board 32 moved by the actuation in the direction of the support part 15 and thus of the actuating part 30 is stopped by the switching dome 20, and that the switching position is thus defined.

The compression of the tactile-feel domes 10 is also stopped at this point. The tactile-feel domes 10 are configured to be monostable; if the force action is removed, the tactile-feel dome 10 in each case returns to its original or initial shape and, at the same time, provides for a return of the circuit board 32, and thus of the actuating part 30, into the rest position. Both the compression of the tactile-feel domes 10 until meeting a resistance as well as the return is perceived by a user as a tactile feedback.

FIGS. 2 and 3 each show in a perspective view the switching mat 5 shown in FIG. 1. It comprises three tactile-feel domes 10 and a switching dome 20 arranged in the center. The tactile-feel domes 10 comprise a frustoconical basic body transitioning into a cylindrical end. FIG. 3 shows a rear view of the switching mat 5.

The invention claimed is:

1. An operating member element, comprising:
    an actuating part movably mounted between a rest position and a switching position;
    a circuit board with an open contacting portion;
    a switching mat made of an elastic material disposed adjacent to the circuit board; and
    at least one contact pill formed on a side of the switching mat facing towards the circuit board;
    which cooperate in such a way that, in the switching position of the actuating part, the open contacting portion of the circuit board is closed by the contact pill, and
    wherein the switching mat moreover forms at least one tactile-feel dome which is associated with the contact pill, is elastically compressible by actuation of the actuating part in a direction of the switching position and which, in an initial position, defines a unilaterally open hollow volume in the switching mat, in order to cause a tactile feedback on the actuating part, wherein the contact pill is disposed outside the hollow volume defined by the tactile-feel dome,
    wherein during the actuation of the actuating part in the direction of the switching position, the circuit board with the open contacting portion is moved towards the contact pill.

2. The operating member according to claim 1, wherein the actuating part defines a touch-sensitive input surface.

3. The operating member according to claim 2, wherein the circuit board is disposed on the side of the actuating part facing away from the touch-sensitive input surface.

4. The operating member according to claim 1, wherein the open contacting portion is disposed on a component-carrying side of the circuit board.

5. The operating member according to claim 1, wherein the contact pill is disposed next to the tactile-feel dome.

6. The operating member according to claim 1, wherein the contact pill is disposed on a raised portion and/or a thickened portion of the switching mat.

7. The operating member according to claim 1, wherein several tactile-feel domes are disposed around an associated contact pill.

8. The operating member according to claim 7, the several tactile-feel domes are evenly spaced around the contact pill.

9. The operating member according to claim 1, wherein several tactile-feel domes are disposed around the contact pill on an imaginary triangle.

10. The operating member according to claim 1, wherein a spacer member is disposed adjacent to the tactile-feel dome and between the switching mat and the actuating part.

11. The operating member according to claim 1, wherein the contact pill is disposed on the side of the switching mat facing away from the unilaterally open hollow volume defined by the tactile-feel dome.

12. The operating member according to claim 6, wherein the raised portion supporting the contact pill defines, in the switching mat, a blind hole for the positive accommodation of an appendage of a rigid support part or of a counter-support part.

13. The operating member according to claim 1, wherein the return of the actuating part to the rest position is effected exclusively by the at least one tactile-feel dome.

* * * * *